J. NITKEY.
HAND CORN-PLANTER.
No. 178,550. Patented June 13, 1876.
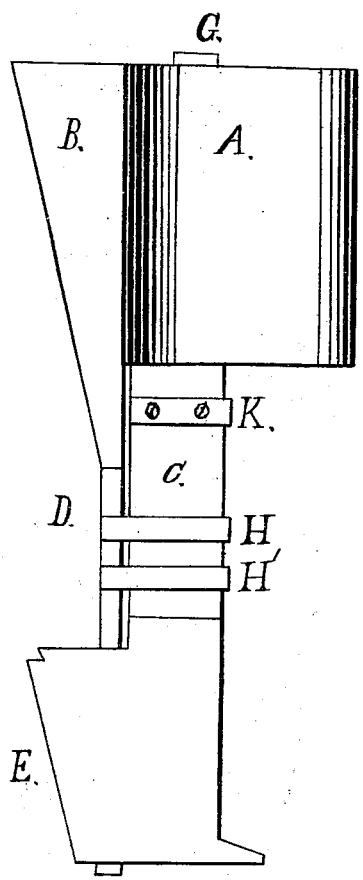
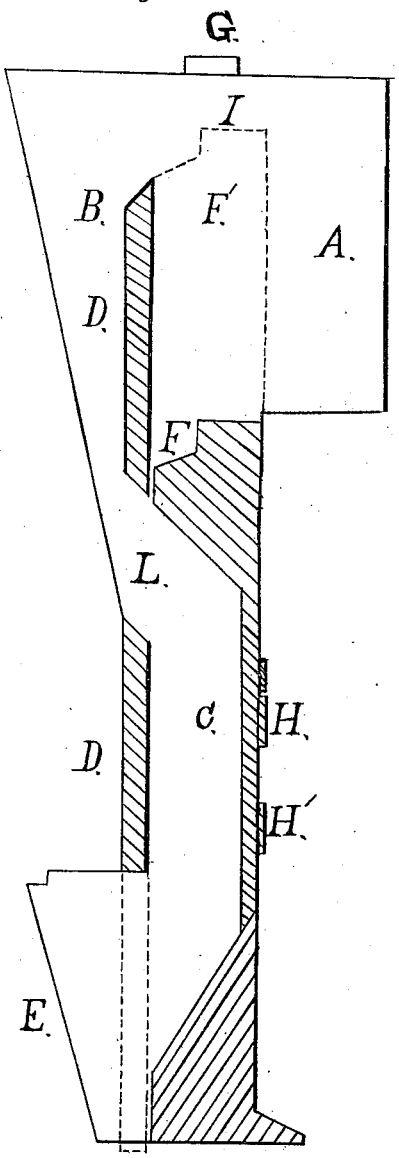
Witnesses:
William Spooner
L. M. Stewart.
Inventor: John Nitkey
Per Morgan & Chamberlain
Attys.

UNITED STATES PATENT OFFICE.

JOHN NITKEY, OF MINNEAPOLIS, MINNESOTA.

IMPROVEMENT IN HAND CORN-PLANTERS.

Specification forming part of Letters Patent No. 178,550, dated June 13, 1876; application filed November 8, 1875.

*To all whom it may concern:*

Be it known that I, JOHN NITKEY, of the city of Minneapolis, State of Minnesota, have invented a Hand Corn-Planter, of which the following is a specification:

The object of my invention is, to form an improved hand corn-planter, which shall be simple in its construction, and at the same time sure to drop an equal number of kernels of corn each time.

The method by which I secure that end is illustrated by the accompanying drawing.

Figure 1 is a side view of my invention; Fig. 2 is a section view of the same.

The same letters represent the same parts in each.

A is a movable hopper, sliding up and down on the standard C, and held in its place by the bands H and H'. C is the standard, which is made partially hollow, as shown by the sectional view in Fig. 2. K is a wooden bar fastened upon the standard, to prevent the hopper from rising above the head of said standard. D is the plunger, which is fastened immovably to the hopper, and perforated with an opening marked L. E is the spring which holds each successive hill of corn, till forced from its position by the plunger. G is the handle by which the planter is carried. F and F' in the sectional view is the measure in its two extreme positions, and I is a screw, by means of which the number of kernels which the measure will hold is regulated.

The operation of my planter is as follows:

The hopper A is filled with corn upon the side of the plunger in which the measure is situated, but not above the top of the plunger. When the machine is carried by the handle the standard will fall by its own weight, and occupy the position shown by the unbroken lines in Fig. 2, with the measure F at the bottom of the hopper. When the planter is pressed upon the ground the standard rises through the hopper until it reaches the position shown by the dotted lines in Fig. 2. The measure F then rises, filled with corn, to the position marked as F' in Fig. 2, when the corn falls out of the measure over the top of the plunger, passing down the inclined side of the hopper, and thence down through the opening represented in Fig. 2 by the letter L, and through the standard until it strikes against the lower part of the plunger opposite the spring E, against which it falls, as the plunger is again lifted by the raising of the planter, and the corn then lies directly under the plunger.

The measure consists of a three-sided cup, with the bottom on an inclined plane, and can be made larger or smaller by means of the screw I, by means of which the bottom is raised or lowered.

I claim as my invention—

The combination, in a hand corn-planter, of the movable hopper A, measure F F', hollow standard C, having stop K, plunger D, having opening L, and spring E, the several parts constructed and arranged to operate in the manner herein shown and described.

JOHN NITKEY.

Witnesses:
S. H. FOLSOM,
L. M. STEWART.